(12) United States Patent
Khanna (10) Patent No.: US 8,805,896 B2
(45) Date of Patent: *Aug. 12, 2014

(54) SYSTEM AND METHOD FOR USE WITH GARBAGE COLLECTED LANGUAGES FOR ENABLING THE ALLOCATED HEAP MEMORY TO BE UPDATED AT RUNTIME

(71) Applicant: Oracle International Corporation, Redwood Shores, CA (US)

(72) Inventor: Prateek Khanna, Bangalore (IN)

(73) Assignee: Oracle International Corporation, Redwood Shores, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/946,540

(22) Filed: Jul. 19, 2013

(65) Prior Publication Data

US 2013/0304771 A1 Nov. 14, 2013

Related U.S. Application Data

(63) Continuation of application No. 13/167,422, filed on Jun. 23, 2011, now Pat. No. 8,495,107.

(51) Int. Cl.
G06F 17/30 (2006.01)
G06F 12/02 (2006.01)
G06F 3/06 (2006.01)

(52) U.S. Cl.
CPC .......... G06F 12/0253 (2013.01); *G06F 3/0689* (2013.01)
USPC ........... 707/813; 707/816; 707/819; 707/820; 711/117; 711/140; 711/173

(58) Field of Classification Search
CPC ............ G06F 12/0253; G06F 12/0269; G06F 12/0276; G06F 12/0615; G06F 2212/702; G06F 2212/7205; G06F 12/0261; G06F 12/0267

USPC .......... 707/813, 816, 819, 820; 711/117, 118, 711/140, 173
See application file for complete search history.

(56) References Cited

U.S. PATENT DOCUMENTS

| | | |
|---|---|---|
| 5,517,643 A | 5/1996 | Davy |
| 6,286,016 B1 | 9/2001 | Heller |

(Continued)

OTHER PUBLICATIONS

Michael Furr; and Jeffrey S. Foster—"Checking type safety of foreign function calls"—Proceeding PLDI '05 Proceedings of the 2005 ACM SIGPLAN conference on Programming language design and implementation—vol. 40 Issue 6, Jun. 2005—pp. 62-72.*

(Continued)

*Primary Examiner* — Anh Ly
(74) *Attorney, Agent, or Firm* — Meyer IP Law Group (57) ABSTRACT

A system and method for use with garbage collected systems and languages, for enabling an allocated heap memory to be updated (e.g., increased or decreased) at runtime, subject to sufficient availability of physical memory. In accordance with an embodiment, a Java Virtual Machine (JVM) is associated with a management console, which allows a systems administrator to monitor current heap utilization at runtime. The heap is visualized as a contiguous chunk of memory with one or more extension points, e.g., by use of a trailing pointer to a null list. If later, at runtime, the heap size needs to be incremented then the trailing pointer can be set to a new chunk of memory with a size of (new value−old value), so that the cumulative new size is made equal to a new value specified on the console.

26 Claims, 5 Drawing Sheets

(56) References Cited

U.S. PATENT DOCUMENTS

| | | | |
|---|---|---|---|
| 6,499,094 | B1 | 12/2002 | Fraser |
| 6,643,753 | B2 | 11/2003 | Avner |
| 6,671,707 | B1* | 12/2003 | Hudson et al. ........ 711/E12.011 |
| 6,816,956 | B1 | 11/2004 | Benayon |
| 7,174,354 | B2* | 2/2007 | Andreasson ................. 711/170 |
| 7,181,585 | B2 | 2/2007 | Abrashkevich |
| 7,409,517 | B2 | 8/2008 | Dageville |
| 7,475,214 | B2 | 1/2009 | Hwang |
| 7,810,080 | B2 | 10/2010 | Plum |
| 7,818,729 | B1 | 10/2010 | Plum |
| 7,827,375 | B2 | 11/2010 | Abrashkevich |
| 7,856,624 | B2 | 12/2010 | Plum |
| 7,870,171 | B2* | 1/2011 | Daynes et al. ................ 707/819 |
| 7,882,160 | B2 | 2/2011 | Adams, III |
| 7,886,124 | B2 | 2/2011 | Muthulingam |
| 2004/0221120 | A1 | 11/2004 | Abrashkevich |
| 2005/0246693 | A1 | 11/2005 | Plum |
| 2006/0130021 | A1 | 6/2006 | Plum |
| 2007/0136385 | A1 | 6/2007 | Abrashkevich |
| 2007/0208839 | A1* | 9/2007 | Voigt et al. .................... 709/223 |
| 2009/0254774 | A1* | 10/2009 | Chamdani et al. ............ 711/118 |
| 2009/0319255 | A1* | 12/2009 | Vengerov ........................ 703/22 |
| 2010/0174845 | A1* | 7/2010 | Gorobets et al. .............. 711/103 |
| 2010/0268876 | A1* | 10/2010 | Reid et al. ..................... 711/114 |
| 2011/0271074 | A1* | 11/2011 | Lyu ................................ 711/173 |
| 2012/0191927 | A1* | 7/2012 | Gorobets et al. ............. 711/156 |

OTHER PUBLICATIONS

"Towards the rapid network-wide deployment of new application specific network protocols, using application level active networking"—A Ghosh—Jan. 8, 2002—cl.cam.ac.uk (pp. 1-181).*

Xu, et al., Finding Low-Utility Data Structures, PLDI'10, Jun. 5-10, 2010, pp. 174-186, vol. 45, Issue 6.

Chang, et al., DMMX: Dynamic Memory Management Extensions, Sep. 15, 2002, pp. 187-199, Journal of Systems and Software, vol. 63, Issue 3.

Biswas, et al., Memory Overflow Protection for Embedded Systems Using Run-Time Checks, Reuse and Compression, Sep. 22-25, 2004, pp. 280-291.

Beebee, et al., An Implementation of Scoped Memory for Real-Time JAVA, 2001, 18 pages.

Unknown Author, (Video), SciPhone Dream G2 JAVA Heap Size, Jun. 23, 2011, 2 pages.

Unknown Author (WIKIPEDIA), Garbage Collection (Computer Science) Apr. 21, 2011, 12 pages.

* cited by examiner

SYSTEM AND METHOD FOR USE WITH GARBAGE COLLECTED LANGUAGES FOR ENABLING THE ALLOCATED HEAP MEMORY TO BE UPDATED AT RUNTIME

FIELD OF INVENTION

This application is a continuation of U.S. patent application Ser. No. 13/167,422, now U.S. Pat. No. 8,495,107 titled "SYSTEM AND METHOD FOR USE WITH GARBAGE COLLECTED LANGUAGES FOR ENABLING THE ALLOCATED HEAP MEMORY TO BE UPDATED AT RUNTIME, filed Jun. 23, 2011, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The invention is generally related to automatic garbage collected languages, such as Java, and is particularly related to a system and method for use with garbage collected languages and systems, for enabling the allocated heap memory to be updated at runtime, subject to sufficient availability of physical memory.

BACKGROUND

In the context of computer systems, software and languages, the software objects for a running software program are generally stored in an area of the system memory where they can be readily accessed. Some languages, such as C and C++, utilize manual memory allocation, which requires that the memory occupied by software objects be manually allocated and deallocated as needed. Other languages, such as Java and C#, utilize dynamic memory allocation, wherein a garbage collector periodically attempts to reclaim any memory occupied by software objects that are no longer in use by running programs—a process referred to as garbage collection.

In garbage collected languages, the area of memory to be garbage collected is generally referred to as the heap. Garbage collection frees the software developer from having to manually account for memory deallocation. Some computer languages that do not include garbage collection as part of their language specification do utilize it for practical or efficiency reasons (e.g., formal languages such as lambda calculus); while other computer languages (e.g., C, C++) that were originally designed to utilize manual memory management, now also provide garbage-collected implementations.

In many environments, the system includes a virtual machine upon which the software program will run. In Java, the virtual machine is referred to as a Java Virtual Machine (JVM), which allows for portability of software applications between different underlying computer architectures, including different computer hardware platforms and/or operating systems, inasmuch as the JVM allows a compiled Java program to be run on the JVM independently of whatever hardware or operating system may be used underneath. Examples of available JVMs include the Oracle JRockit and Hotspot products. Each JVM includes a garbage collector component that handles the garbage collection process for that JVM.

However, a problem with many JVM implementations is that the JVM heap generally must be sized precisely at startup; and once specified, the heap settings cannot be altered at runtime. This limitation can result in a software program at runtime using up all of the allocated memory, ultimately culminating in an out-of-memory error (e.g., OutOfMemoryError). This is the general area that embodiments of the invention are intended to address.

SUMMARY

Disclosed herein is a system and method for use with garbage collected systems and languages, for enabling an allocated heap memory to be updated (e.g., increased or decreased) at runtime, subject to sufficient availability of physical memory. In accordance with an embodiment, a Java Virtual Machine (JVM) is associated with a management console, which allows a systems administrator to monitor current heap utilization at runtime. The console also allows editing of attributes such as currently-allocated max heap attribute, max eden size, max tenured size, or max permgen space. The heap is visualized as a contiguous chunk of memory with one or more extension points, e.g., by use of a trailing pointer to a null list. If later, at runtime, the heap size needs to be incremented then the trailing pointer can be set to a new chunk of memory with a size of (new value–old value), so that the cumulative new size is made equal to a new value specified on the console. The new chunk of memory can again end with a trailing pointer, to allow for further extension. Over a period of time, the heap may include a number of such extension points, and may need to be uncluttered using an explicit defragmentation during a maintenance window which can be initiated from the console. During defragmentation, garbage collection is temporarily disabled, and all of the distributed chunks of memory can be allocated in sequence with a single null extension point per section. The features can help ensure that an alert administrator will have the means to prevent an out-of-memory situation when the allocated heap proves insufficient at runtime.

DETAILED DESCRIPTION

As described above, in garbage collected languages, the area of memory generally referred to as the heap is periodically garbage collected to reclaim any memory occupied by software objects that are no longer in use by running programs. For example, a Java Virtual Machine (JVM) includes a garbage collector component that handles the garbage collection process for that JVM. However, the JVM heap generally must be sized precisely at startup; and once specified, the heap settings cannot be altered at runtime. This limitation can result in a software program at runtime using up all of the allocated memory, ultimately culminating in an out-of-memory error (e.g., OutOfMemoryError).

To address this, disclosed herein is a system and method for use with garbage collected systems and languages, for enabling an allocated heap memory to be updated (e.g., increased or decreased) at runtime, subject to sufficient availability of physical memory. As described herein, the Java language and the JVM virtual machine are included as one example of a garbage-collected language, for purposes of illustrating various embodiments of the invention. In accordance with other embodiments, the systems and methods described herein can be similarly used with other garbage-collected languages and virtual machines. In accordance with an embodiment, a JVM is associated with a management console, which allows a systems administrator to monitor current heap utilization at runtime. The console also allows editing of attributes such as currently-allocated max heap attribute, max eden size, max tenured size, or max permgen space. The heap is visualized as a contiguous chunk of memory with one or more extension points, e.g., by use of a trailing pointer to a null list. If later, at runtime, the heap size needs to be incremented then the trailing pointer can be set to a new chunk of memory with a size of (new value−old value), so that the cumulative new size is made equal to a new value specified on the console. The new chunk of memory can again end with a trailing pointer, to allow for further extension. Over a period of time, the heap may include a number of such extension points, and may need to be uncluttered using an explicit defragmentation during a maintenance window which can be initiated from the console. During defragmentation, garbage collection is temporarily disabled, and all of the distributed chunks of memory can be allocated in sequence with a single null extension point per section. The features can help ensure that an alert administrator will have the means to prevent an out-of-memory situation when the allocated heap proves insufficient at runtime.

Figure 1:
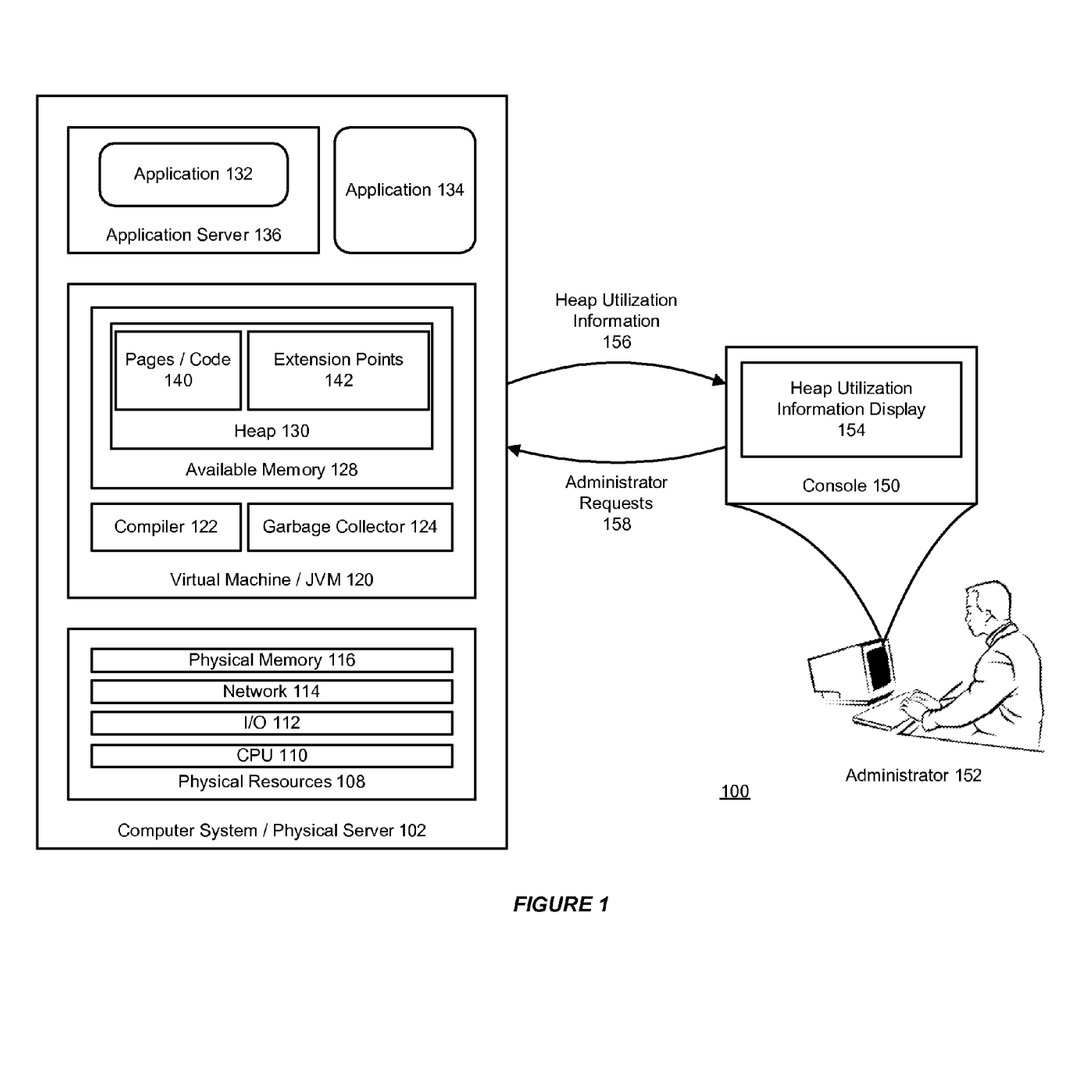
FIG. 1 shows an illustration of a system for use with garbage collected languages and systems, for enabling the allocated heap memory to be increased at runtime, subject to sufficient availability of physical memory, in accordance with an embodiment.

FIG. 1 shows an illustration of a system for use with garbage collected languages and systems, for enabling the allocated heap memory to be increased at runtime, subject to sufficient availability of physical memory, in accordance with an embodiment. As shown in FIG. 1, the system 100 comprises one or more physical computers, servers, or computing devices 102. Each computer or computing device includes a set of physical resources 108, such as a processor (CPU) 110, input/output (I/O) components 112, networking resources 114, and physical memory storage 116. A virtual machine 120 (which in the context of the Java language can be, e.g., an Oracle Hotspot, JRockit, or another JVM implementation) allows compiled software programs to be run on the virtual machine, independently of the hardware or operating system used underneath. Each virtual machine also includes a compiler 122, and a garbage collector 124. An available memory 128 comprises a heap 130, for storage of compiled bytecode, typically as pages 140, and one or more extension points 142, the use of which are described in further detail below.

As further shown in FIG. 1, in accordance with an embodiment, the system allows one or more software applications or programs 132, 134 to be run thereon. Software applications can optionally run within an application server (e.g., a WebLogic instance, or a similar application server instance). The JVM is associated with a management console (i.e. a console) 150, which allows a system administrator (i.e. an administrator) 152 to display or otherwise monitor the system's current heap utilization information 154 at runtime. In accordance with an embodiment, the console also allows editing by the administrator of various heap attributes, e.g., the currently-allocated max heap, max eden size, max tenured size, or max permgen space attributes. Information about the heap utilization can be received 156 from the JVM into the console, for review by the administrator at runtime. Requests from the administrator can also be communicated 158 via the console, to the JVM.

In accordance with an embodiment, each console associated with a running JVM can be provided as a client-server mode application (similar to, e.g., jconsole) which allows monitoring current heap utilization. The console can also be configured to allow editing of attributes such as the currently allocated max heap attribute, max eden size or max tenured size or max permgen space.

Figure 2:
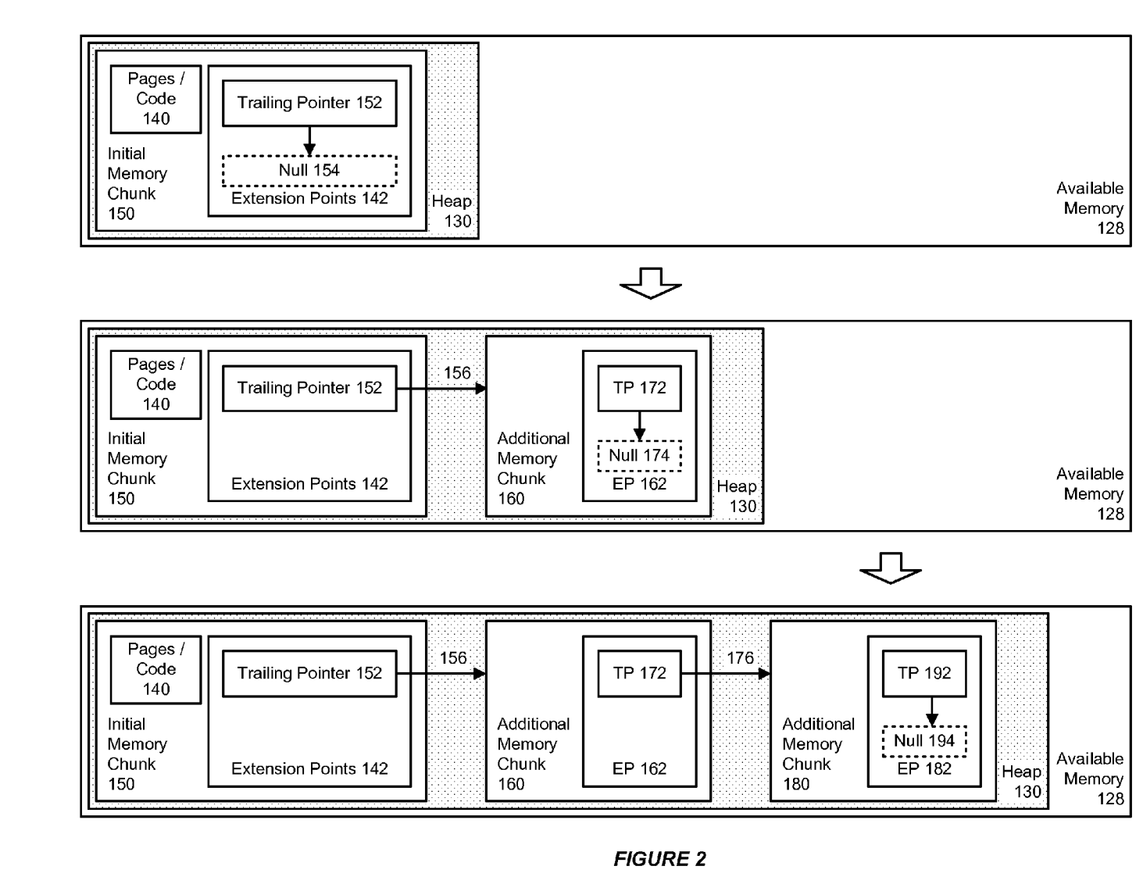
FIG. 2 shows an illustration of how the allocated heap memory can be increased at runtime, using extension points, in accordance with an embodiment.

FIG. 2 shows an illustration of how the allocated heap memory can be increased at runtime, using extension points, in accordance with an embodiment. As shown in FIG. 2, the heap is visualized not as a contiguous chunk of memory, but rather as a contiguous chunk of memory with one or more extension points. In accordance with an embodiment, the heap 130 stores compiled bytecode, typically as pages 140, for execution by the virtual machine. The heap comprises an initial memory chunk 150, together with one or more extension points 142. In accordance with an embodiment, the heap and its initial memory chunk can be configured to initially match a startup configuration for the JVM, as might be specified by the administrator in a configuration file. Each of the extension points can be provided as a trailing pointer 152, which initially points to null, but which can be modified later to point to a new area of memory.

As further shown in FIG. 2, at a later point in time, if the administrator determines that a larger heap size might be useful, perhaps by monitoring the heap utilization information displayed by the console and in anticipation of an out-of-memory situation, the administrator can request the JVM to extend its heap, or a subsection thereof. In accordance with an embodiment, when such a request is received, an additional memory chunk 160 of appropriate size is created in memory, and the trailing pointer of the initial memory chunk modified so that it points 156 to the additional memory chunk. The additional memory chunk can include its own extension points 162, which can similarly end with a trailing pointer 172 pointing to null 174, to allow for further extension in a chaining manner. In this manner, the heap 130 can be successively extended, as illustrated in FIG. 2 by the shaded area, to address the request from the console.

As further shown in FIG. 2, at a yet later point in time, if the administrator determines that a yet larger heap size might be useful, the administrator can again use the console to request the JVM to further extend its heap, or a subsection thereof. As before, when the request is received, an additional memory chunk 180 is created in memory, and the trailing pointer of the last memory chunk modified so that it points 176 to the additional memory chunk. The additional memory chunk can again include its own extension points 182, similarly ending with a trailing pointer 192 pointing to null 194, to allow for further extension, subject to available memory 128.

By way of example, suppose that the JVM heap attributes initially indicate that:

$$Xms=Xmx=1\ GB$$

and that the administrator is allowed to set values for heap size using the console. Then, in this example, the heap size can be initially allocated as 1 GB, but with a trailing pointer to a null list. If later, it is determined that the heap size needs to be incremented, then, in response to a request from the administrator this trailing pointer can be set to a new chunk of memory with a size equal to (new value−old value). Hence the cumulative new heap size becomes equal to the new value specified on the console, which is calculated as:

new value=old value+(new value−old value)

As described above, the new chunk of memory again needs to end with a trailing pointer to account for any further extension in future. In accordance with an embodiment, if the total available physical memory is less than the new value specified, then the operation will be disallowed.

Figure 3:
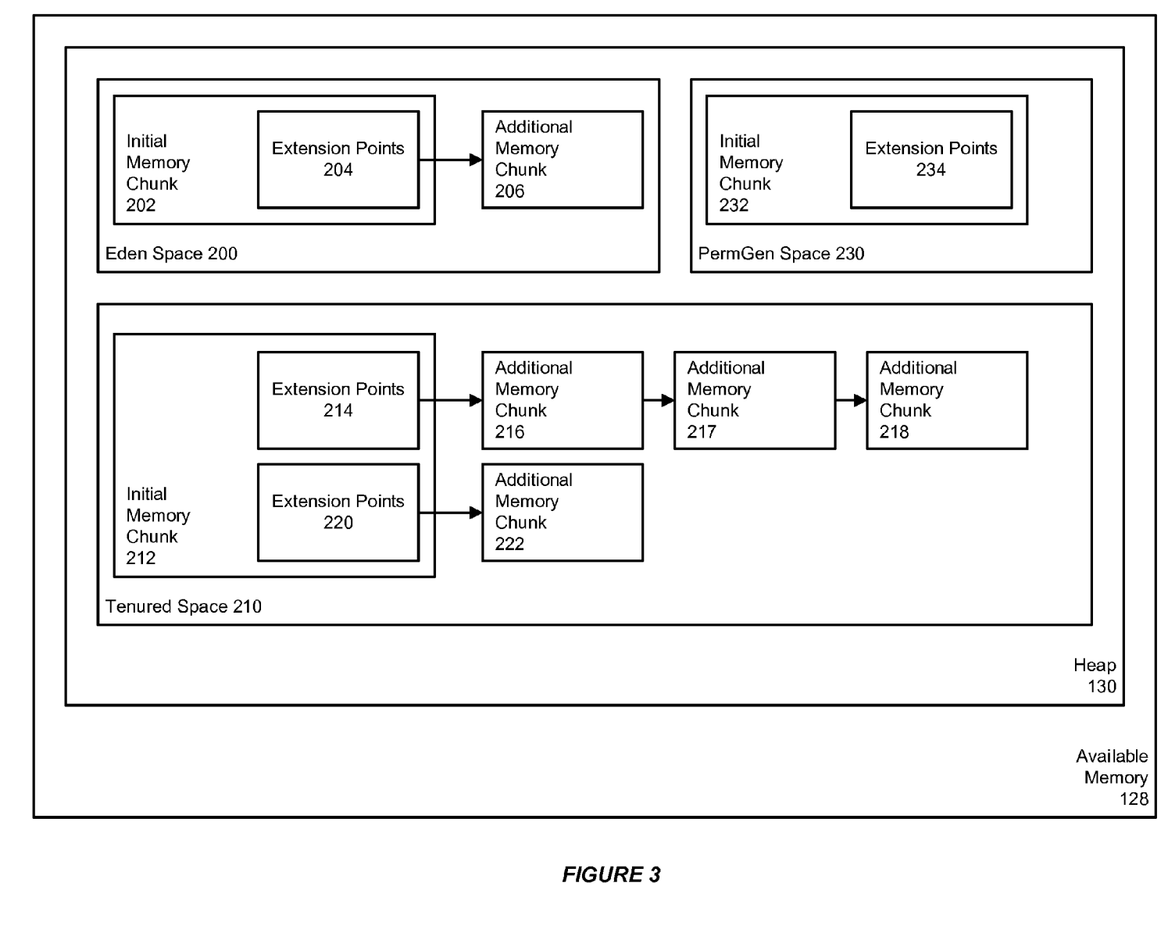
FIG. 3 shows an illustration of how one or more subsections of the allocated heap memory can be increased at runtime, in accordance with an embodiment.

FIG. 3 shows an illustration of how one or more subsections of the allocated heap memory can be increased at runtime, in accordance with an embodiment. As shown in FIG. 3, in addition to extending the heap as a whole, the administrator can alternatively elect to extend particular subsections of the heap. For example, as shown in FIG. 3, the heap can include subsections such as eden spaces 200, tenured space 210, and permgen space 230, that can be extended independently. In accordance with other embodiments and implementations, the memory/heap space can be configured differently from the one illustrated.

As shown in FIG. 3, each subsection can be associated with its own initial memory chunk space 202, 212, 232, which using the above described techniques can include extension points 204, 214, 215, 232, that allow additional memory chunks 206, 216, 217, 218, 222 to be added as desired by the administrator. As illustrated in the example of FIG. 3, in accordance with an embodiment, some spaces can have multiple extension points, e.g., tenured space 210 is illustrated with two extension points, each of which allows additional memory chunks to be extended. Other memory subsections can utilize a single extension point that can be increased by successively chaining trailing pointers as described above. In this manner, the technique can be applied at an individual subsection level as well, e.g., by modifying the max eden size, or max tenured size or max perm size, each of which can be extended at runtime using extension points.

Figure 4:
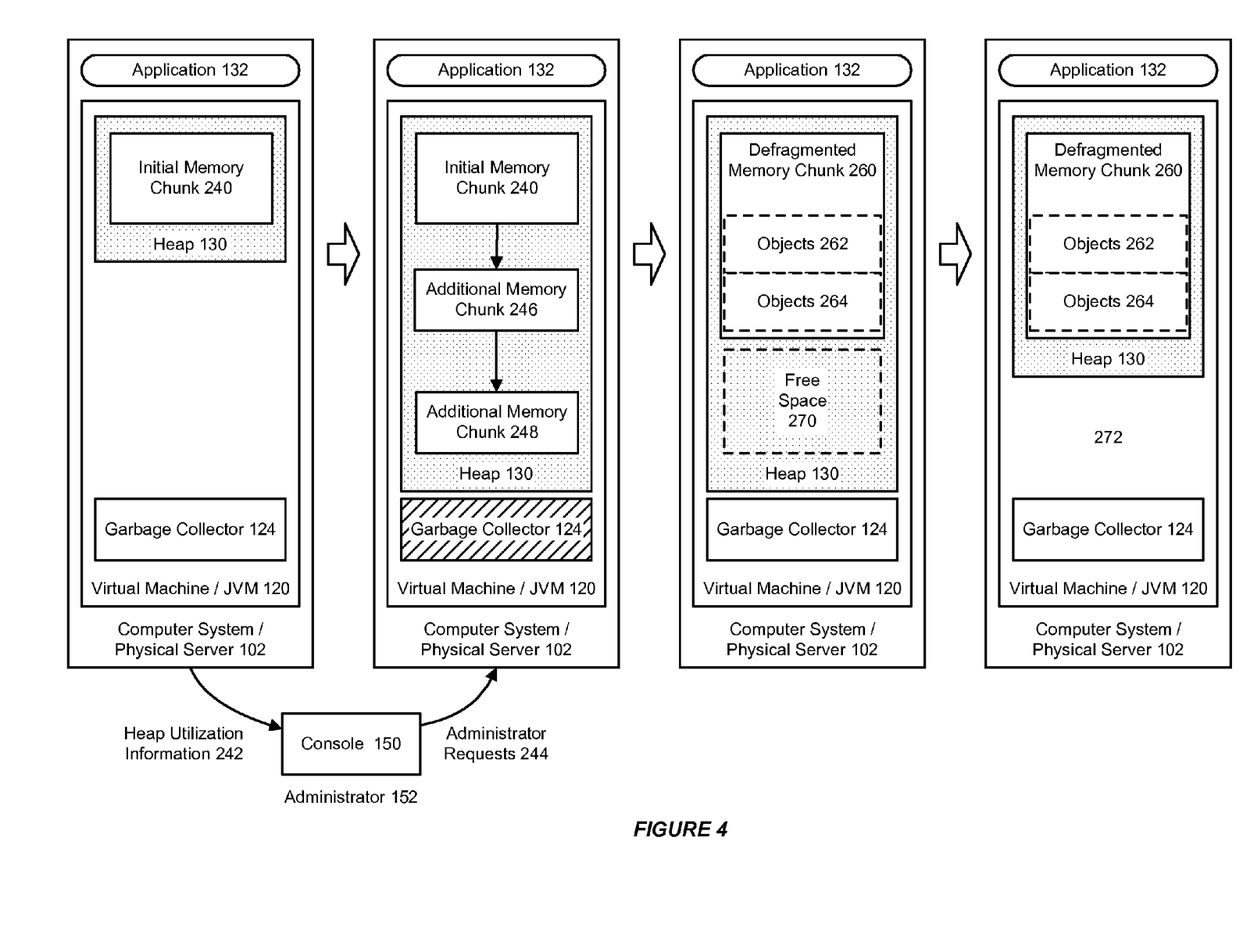
FIG. 4 shows an illustration of how the allocated heap memory can be updated by an administrator at runtime, and subsequently defragmented, in accordance with an embodiment.

FIG. 4 shows an illustration of how the allocated heap memory can be updated by an administrator at runtime, and subsequently defragmented, in accordance with an embodiment. Over a period of time the heap may include a number of extension points, and may need to be uncluttered using an explicit defragmentation during a maintenance window which can be initiated from the console. As shown in FIG. 4, the heap may include an initial memory chunk 240. Through feedback of heap utilization information 242, and receipt of administrator requests 244, the heap may be extended with one or more additional memory chunks 246, 248. In accordance with an embodiment, during defragmentation all of the distributed chunks of memory can be allocated in sequence 260, including the objects therein 262, 264, with a single null extension point per section. The garbage collector and/or garbage collection process 124 will be temporarily disabled until this activity is completed. The remaining free space 270 in the heap can be subsequently used for heap purposes, or, in accordance with an embodiment, can be recaptured 272 for use by the virtual machine, (including decreasing/shrinking the heap size or its subsections where appropriate).

In accordance with an embodiment, a request from the administrator to decrease the heap size can be used by the system to initiate a defragmentation cycle. If, after defragmentation, the used memory is greater than that specified by the administrator using the console, then the current heap size will be retained and the administrator notified accordingly. This prevents the system from discarding portions of the heap currently in use, even if requested to do so (perhaps inadvertently) by the administrator.

Figure 5:
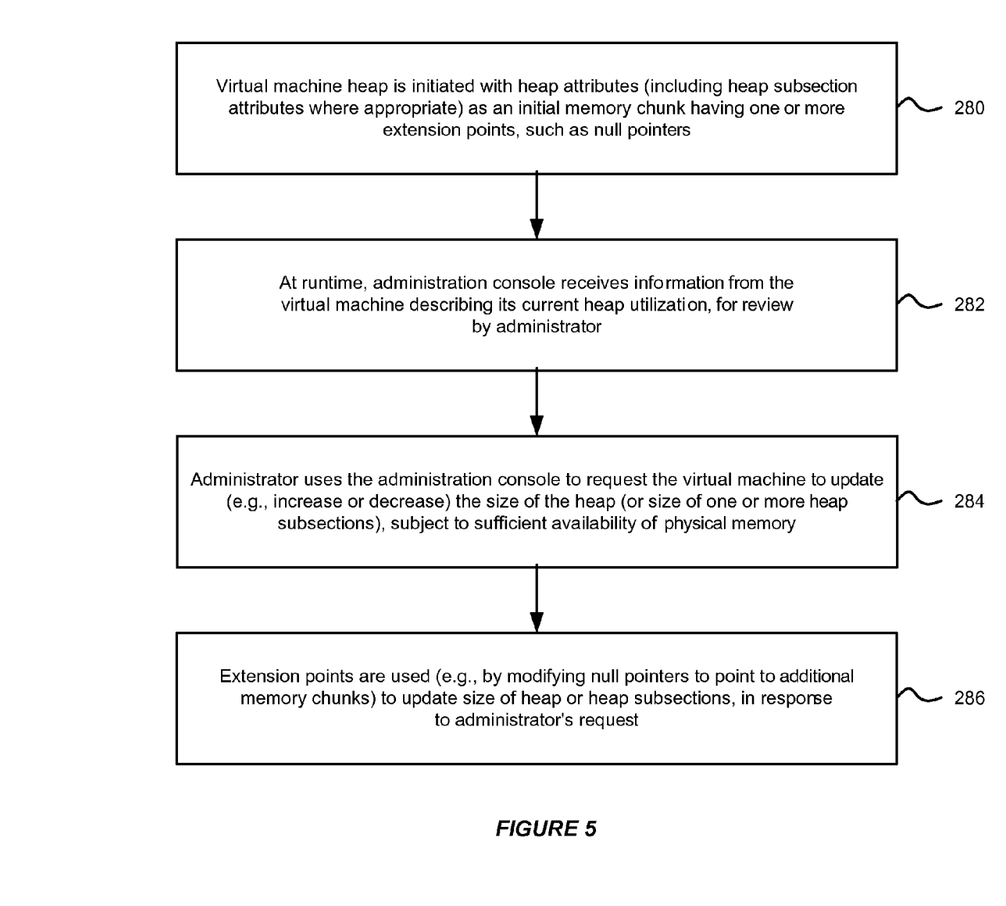
FIG. 5 shows a flowchart of a method for use with garbage collected languages and systems, for enabling the allocated heap memory to be increased at runtime, subject to sufficient availability of physical memory, in accordance with an embodiment.

FIG. 5 shows a flowchart of a method for use with garbage collected languages and systems, for enabling the allocated heap memory to be increased at runtime, subject to sufficient availability of physical memory, in accordance with an embodiment. As shown in FIG. 5, in step 280, the virtual machine heap is initiated with heap attributes (including heap subsection attributes where appropriate) as an initial memory chunk having one or more extension points, such as null pointers. In step 282, at runtime, the administration console receives information from the virtual machine describing its current heap utilization, for review by the system administrator. In step 284, the administrator uses the administration console to request the virtual machine to update (e.g. increase or decrease) the size of the heap (or the size of one or more heap subsections), subject to sufficient availability of physical memory. In step 286, if the request is one to increase the size of the heap, then extension points are used, e.g., by modifying null pointers to point to additional memory chunks, to increase the size of the heap or heap subsections, in response to the administrator's request.

In accordance with an embodiment, the above-described features help ensure that an alert administrator will have the means to prevent an out-of-memory (e.g., OutOfMemoryError) situation when the allocated heap proves insufficient at runtime, rather than having to helplessly await an application crash. Given that memory overflow accounts for a large number of reported problems for automatic garbage collected platforms, the above provides a workaround for such situations.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, as described above, the Java language and the JVM virtual machine are included as one example of a garbage-collected language, for purposes of illustrating various embodiments of the invention. In accordance with other embodiments, the systems and methods described herein can be similarly used with other garbage-collected languages and virtual machines. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A computer system for use with garbage collected languages, for enabling areas of an allocated heap memory to be increased at runtime, comprising:
 a computing device which includes a processor, a virtual machine, and a heap having an initial allocated memory area comprising one or more memory spaces or subsections for storage of software application bytecode, wherein each of the one or more memory spaces or subsections includes
  an initial memory chunk of the initial memory area having one or more extension points, and
  wherein each of the one or more extension points includes a trailing pointer that is configured to be modified in response to receiving a request to increase a size of that memory space or subsection, to point to one or more additional memory chunks external to the initial allocated memory area of said heap and increase the size of that memory space or subsection; and
 wherein, in response to receiving a request to increase the size of a particular memory space or subsection, the system modifies the trailing pointer of the one or more extension points associated with the particular memory space or subsection, to add one or more additional memory chunks, external to the initial allocated memory area of said heap and increase the size of the particular memory space or subsection and thereby also extending the heap to a memory area larger than the initial allocated memory area.

2. The system of claim 1, wherein the heap includes a plurality of memory spaces or subsections, and wherein each of the plurality of memory spaces or subsections includes an initial memory chunk having one or more extension points that can point to additional memory chunks external to the initial allocated memory area of said heap.

3. The system of claim 2, wherein the plurality of memory spaces or subsections includes an eden space and a tenured space, and wherein each of the eden space and the tenured space includes an initial memory chunk having one or more extension points.

4. The system of claim 1, wherein upon receiving a request to defragment the heap, subsequent to addition of one or more memory chunks, the heap is defragmented and garbage collection is temporary disabled until all memory chunks, including the one or more additional memory chunks, are allocated in a sequence including the objects therein, and previously occupied memory is subsequently recaptured for use by the virtual machine.

5. The system of claim 1, wherein the garbage collected language is Java, and the virtual machine is a Java virtual machine (JVM).

6. A computer-implemented method for use with garbage collected languages on a computing device which includes a processor, a virtual machine, and a heap having an initial allocated memory area divided into a plurality of subsections each having an initial memory chunk for storage of software application bytecode, the method comprising:
 providing an extension point in each said initial memory chunk and providing a plurality of extension points in at least one said initial memory chunk of at least one subsection of said plurality of subsections, wherein each extension point includes a trailing pointer that is configured to be modified in response to receiving a request to increase a size of that subsection; and
 receiving a request to increase the size of a particular subsection of said plurality of subsections;
 modifying the trailing pointer of the extension point associated with the initial memory chunk of said particular subsection to add an additional memory chunk external to the initial allocated memory area of the heap;
 thereby extending said particular subsection to include said initial memory chunk and said additional memory chunk; and
 thereby also extending the heap to a memory area larger than the initial allocated memory area.

7. The computer-implemented method of claim 6, wherein the plurality of subsections includes an eden space and a tenured space, and wherein each of the eden space and the tenured space includes an initial memory chunk having an extension point.

8. The computer-implemented method of claim 6, wherein the garbage collected language is Java, and the virtual machine is a Java virtual machine (JVM).

9. The computer-implemented method of claim 6, further comprising:
 receiving a request to defragment the heap;
 temporarily disabling garbage collection;
 allocating all additional memory chunks in sequence including the objects therein; and
 enabling garbage collection to recapture previously occupied memory for use by the virtual machine.

10. The computer-implemented method of claim 6, further comprising:
 providing an extension point in said additional memory chunk wherein said extension point includes a trailing pointer that is configured to modified in response to receiving a request to increase a size of said particular subsection;
 receiving a second request to increase the size of said particular subsection of said plurality of subsections; and
 modifying the trailing pointer of the extension point associated with said additional memory chunk to add a second additional memory chunk external to the initial allocated memory area of the heap.

11. The computer-implemented method of claim 6, further comprising:
 receiving a request to increase the size of a different particular subsection of said plurality of subsections; and
 modifying the trailing pointer of the extension point associated with the initial memory chunk of said different particular subsection to add a second additional memory chunk external to the initial allocated memory area of the heap.

12. The computer-implemented method of claim 6, further comprising:
 providing a console in communication with the virtual machine whereby a user can request the virtual machine to increase the size of a particular subsection of said plurality of subsections of said heap.

13. A non-transitory computer readable storage medium, including instructions stored thereon, for use with garbage collected languages on a computing device which includes a processor, a virtual machine, and a heap having an initial allocated memory area divided into a plurality of subsections each having an initial memory chunk for storage of software application bytecode, which instructions, when read and executed by a computer, cause the computer to perform steps comprising:

providing an extension point in each said initial memory chunk and providing a plurality of extension points in an initial memory chunk of at least one subsection of said plurality of subsections, wherein each extension point includes a trailing pointer that is configured to be modified in response to receiving a request to increase a size of that subsection; and receiving a request to increase the size of a particular subsection of said plurality of subsections;

modifying the trailing pointer of the extension point associated with the initial memory chunk of said particular subsection to add an additional memory chunk external to the initial allocated memory area of the heap;

thereby extending said particular subsection to include said initial memory chunk and said additional memory chunk; and thereby also extending the heap to a memory area larger than the initial allocated memory area.

14. The non-transitory computer readable storage medium of claim 13, wherein the plurality of subsections includes an eden space and a tenured space, and wherein each of the eden space and the tenured space includes an initial memory chunk having an extension point.

15. The non-transitory computer readable storage medium of claim 13, including instructions stored thereon which when read and executed by a computer, cause the computer to perform steps further comprising:

receiving a request to defragment the heap;
temporarily disabling garbage collection;
allocating all additional memory chunks in sequence including the objects therein; and
enabling garbage collection to recapture previously occupied memory for use by the virtual machine.

16. The non-transitory computer readable storage medium of claim 13, including instructions stored thereon which when read and executed by a computer, cause the computer to perform steps further comprising:

providing an extension point in said additional memory chunk wherein said extension point includes a trailing pointer that is configured to modified in response to receiving a request to increase a size of said particular subsection;

receiving a second request to increase the size of said particular subsection of said plurality of subsections; and modifying the trailing pointer of the extension point associated with said additional memory chunk to add a second additional memory chunk external to the initial allocated memory area of the heap.

17. The non-transitory computer readable storage medium of claim 13, including instructions stored thereon which when read and executed by a computer, cause the computer to perform steps further comprising:

receiving a request to increase the size of a different particular subsection of said plurality of subsections; and modifying the trailing pointer of the extension point associated with the initial memory chunk of said different particular subsection to add a second additional memory chunk external to the initial allocated memory area of the heap.

18. The non-transitory computer readable storage medium of claim 13, including instructions stored thereon which when read and executed by a computer, cause the computer to perform steps further comprising:

providing a console in communication with the virtual machine whereby a user can request the virtual machine to increase the size of a particular subsection of said plurality of subsections of said heap.

19. A computer-implemented method for use with garbage collected languages on a computing device which includes a processor, a virtual machine, and a heap having an initial allocated memory area divided into a plurality of subsections each having an initial memory chunk for storage of software application bytecode, the method comprising:

providing an extension point in each said initial memory chunk wherein each extension point includes a trailing pointer that is configured to be modified in response to receiving a request to increase a size of that subsection, and wherein the plurality of subsections includes an eden space and a tenured space, and wherein each of the eden space and the tenured space includes an initial memory chunk which is provided with an extension point; and receiving a request to increase the size of a particular subsection of said plurality of subsections;

modifying the trailing pointer of the extension point associated with the initial memory chunk of said particular subsection to add an additional memory chunk external to the initial allocated memory area of the heap;

thereby extending said particular subsection to include said initial memory chunk and said additional memory chunk; and thereby also extending the heap to a memory area larger than the initial allocated memory area.

20. The computer-implemented method of claim 19, further comprising:

providing an extension point in said additional memory chunk wherein said extension point includes a trailing pointer that is configured to be modified in response to receiving a request to increase a size of said particular subsection;

receiving a second request to increase the size of said particular subsection of said plurality of subsections; and modifying the trailing pointer of the extension point associated with said additional memory chunk to add a second additional memory chunk external to the initial allocated memory area of the heap.

21. The computer-implemented method of claim 19, further comprising:

receiving a request to increase the size of a different particular subsection of said plurality of subsections; and modifying the trailing pointer of the extension point associated with the initial memory chunk of said different particular subsection to add a second additional memory chunk external to the initial allocated memory area of the heap.

22. The computer-implemented method of claim 19, further comprising:

providing a console in communication with the virtual machine whereby a user can request the virtual machine to increase the size of a particular subsection of said plurality of subsections of said heap.

23. A non-transitory computer readable storage medium, including instructions stored thereon, for use with garbage collected languages on a computing device which includes a processor, a virtual machine, and a heap having an initial allocated memory area divided into a plurality of subsections each having an initial memory chunk for storage of software application bytecode, which instructions, when read and executed by a computer, cause the computer to perform steps comprising:

providing an extension point in each said initial memory chunk wherein each extension point includes a trailing pointer that is configured to be modified in response to receiving a request to increase a size of that subsection, and wherein the plurality of subsections includes an eden space and a tenured space, and wherein each of the eden space and the tenured space includes an initial memory chunk which is provided with an extension point; and receiving a request to increase the size of a particular subsection of said plurality of subsections;

modifying the trailing pointer of the extension point associated with the initial memory chunk of said particular subsection to add an additional memory chunk external to the initial allocated memory area of the heap;

thereby extending said particular subsection to include said initial memory chunk and said additional memory chunk; and thereby also extending the heap to a memory area larger than the initial allocated memory area.

24. The non-transitory computer readable storage medium of claim 23, including instructions stored thereon which when read and executed by a computer, cause the computer to perform steps further comprising:

providing an extension point in said additional memory chunk wherein said extension point includes a trailing pointer that is configured to be modified in response to receiving a request to increase a size of said particular subsection;

receiving a second request to increase the size of said particular subsection of said plurality of subsections; and modifying the trailing pointer of the extension point associated with said additional memory chunk to add a second additional memory chunk external to the initial allocated memory area of the heap.

25. The non-transitory computer readable storage medium of claim 23, including instructions stored thereon which when read and executed by a computer, cause the computer to perform steps further comprising:

receiving a request to increase the size of a different particular subsection of said plurality of subsections; and modifying the trailing pointer of the extension point associated with the initial memory chunk of said different particular subsection to add a second additional memory chunk external to the initial allocated memory area of the heap.

26. The non-transitory computer readable storage medium of claim 23, including instructions stored thereon which when read and executed by a computer, cause the computer to perform steps further comprising:

providing a console in communication with the virtual machine whereby a user can request the virtual machine to increase the size of a particular subsection of said plurality of subsections of said heap.

* * * * *

UNITED STATES PATENT AND TRADEMARK OFFICE
CERTIFICATE OF CORRECTION

PATENT NO. : 8,805,896 B2  
APPLICATION NO. : 13/946540  
DATED : August 12, 2014  
INVENTOR(S) : Khanna Page 1 of 1

It is certified that error appears in the above-identified patent and that said Letters Patent is hereby corrected as shown below:

In the Claims

In column 7, line 35, in Claim 1, delete "chunks," and insert -- chunks --, therefor.

In column 7, line 36, in Claim 1, delete "heap" and insert -- heap, --, therefor.

In column 7, line 52, in Claim 4, delete "heap,subsequent" and insert -- heap subsequent --, therefor.

In column 7, line 54, in Claim 4, delete "temporary" and insert -- temporarily --, therefor.

In column 7, line 56, in Claim 4, before "sequence" delete "a".

In column 8, line 39, in Claim 10, delete "to modified" and insert -- to be modified --, therefor.

In column 9, line 45, in Claim 16, delete "to modified" and insert -- to be modified --, therefor.

Signed and Sealed this  
Third Day of March, 2015

Michelle K. Lee  
*Deputy Director of the United States Patent and Trademark Office*